Aug. 9, 1932.  H. H. WARD, JR  1,871,138
INSULATED LID OR COVER
Filed July 21, 1931
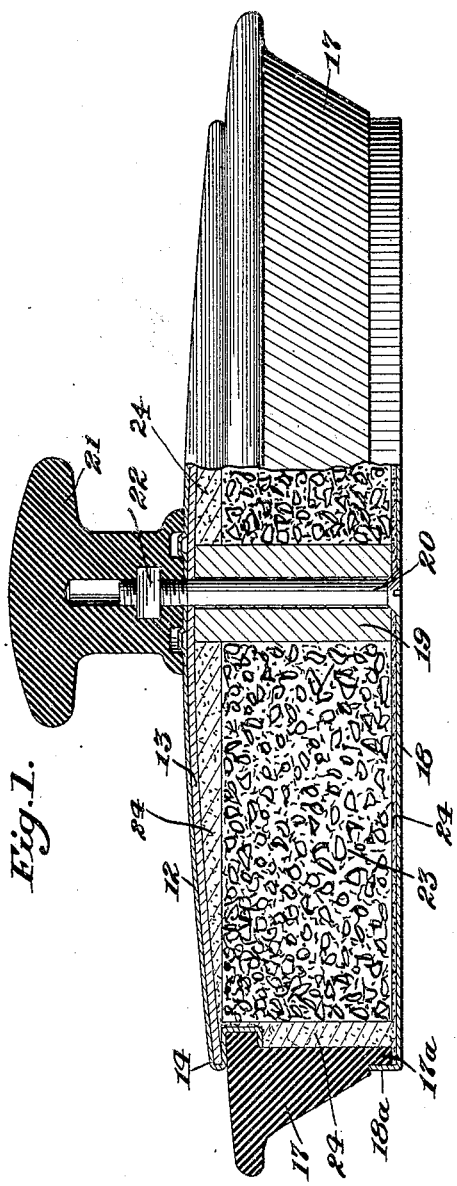
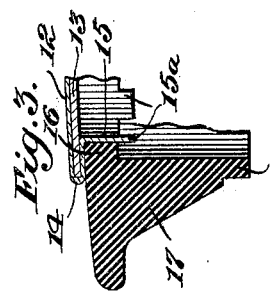
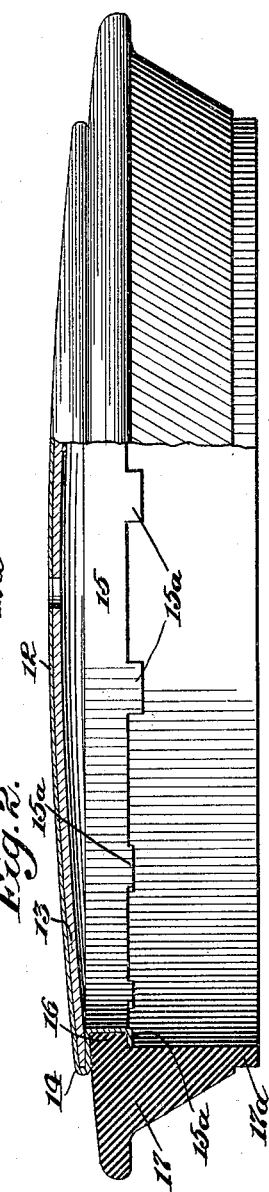
Inventor:
Hugh H. Ward, Jr
by Calvert Calvin
Attys.

Patented Aug. 9, 1932

1,871,138

UNITED STATES PATENT OFFICE

HUGH H. WARD, JR., OF CHESTER, PENNSYLVANIA

INSULATED LID OR COVER

Application filed July 21, 1931. Serial No. 552,254.

This invention relates to lids or covers for ice cream cabinets of that class in which cans of ice cream are placed for dispensing the cream, and in which it is customary to locate a refrigerating apparatus for keeping the ice cream cold. These cabinets are of various sizes adapted to contain from two to six or any other desired number of cans, and the tops of these cabinets are provided with circular openings of a size suitable to admit the convenient access to the cans. These openings are provided with insulated lids or covers, and this invention has for its object to provide an insulated cabinet lid or cover which will be strong and durable and which is constructed to hold a packing ring or gasket securely in place on the lid or cover, so as to make a tight fit for the lid or cover in the opening which it is to close.

In the accompanying drawing Fig. 1 is a partial sectional view of a circular lid or cover constructed in accordance with the present invention. Fig. 2 is a partial sectional view of the same with certain parts omitted, and Fig. 3 is a detail view to illustrate how certain parts are assembled.

Referring to the drawing, 12 denotes the circular top plate of the cover which is preferably of Monel metal to afford a suitable finish. The monel top plate is of a comparatively soft metal, and to strengthen the same a steeel plate 13, of suitable thickness, is located beneath the top plate 12, this steel plate being of a size so that it extends between the plies of a peripheral looped part 14 of the top plate 12, said looped part being clinched down tight so as to hold the said steel plate securely against the said top plate. The looped part or loop 14 is integral or in one piece with the said top plate 12.

The looped part 14 of the top plate has a downward extension 15 against which an inner lip 16 of a rubber packing ring or gasket 17 is located. This downward extension 15 is provided with a series of lugs 15$^a$ which, after the rubber ring or gasket has been located in place, are turned outward and clinched against the lip 16 of the ring or gasket 17, as shown in Fig. 2, so as to securely attach the said ring or gasket to the peripheral looped part 14 of the top plate 12, as will be understood from Figs. 2 and 3.

At the center of the lid or cover, between the steel plate 13 and the bottom plate 18, a cylindrical spacer 19 of wood or other suitable metal is located, said spacer having a central opening for the reception of the body of a screw 20. The head of the screw impinges against the bottom plate 18, and thus serves to hold said bottom plate in place. The screw 20 extends upward into a knob 21, preferably of hard rubber, said knob having molded therein a metal nut 22 fitting the threaded part of the screw 20. This metal nut affords a good grip of the screw on the knob 21 the interior of which is preferably threaded, in molding, for the reception of the threaded part of the screw 20.

The periphery of the bottom plate 18 is turned up to form a flange 18$^a$ to engage a circular lip 17$^a$ at the bottom of the packing ring or gasket 17.

The space between the steel reinforcing plate 13 and the bottom plate 18 is preferably filled with ground cork or other suitable insulating material 23, as shown in Fig. 1.

From the foregoing it will be understood that the invention provides an insulating cover or lid the top of which is not liable to become indented or defaced owing to the reinforcing steel plate 13, and the invention ensures a secure attachment of the packing rubber ring or gasket to the lid or cover.

The improved lid or cover will preferably comprise linings or fillings 24 of hydrolene, which is the commercial name for a non-odorous grade of asphalt used in ice cream and dairy industries, both as a bond and a sealer, and it is for these purposes that it is used in connection with the present invention.

Having thus described my invention I claim and desire to secure by Letters Patent:

1. A lid or cover comprising a top plate having an integral peripheral loop, a reinforcing steel plate the peripheral part of which extends into said loop to attach said plates together, said loop having a downward extension provided at its bottom with lugs a peripheral packing ring or gasket having at its top an inwardly extending lip fitting against said downward extension and engaged by said lugs, when they are turned outward and engaged with said lip.

2. A lid or cover comprising a top plate having an integral peripheral loop, a reinforcing steel plate the peripheral part of which extends into said loop to attach said plates together, said loop having a downward extension provided at its bottom with lugs, a peripheral packing ring or gasket having at its top an inwardly extending lip fitting against said downward extension and engaged by said lugs when they are turned outward and engaged with said lip, said ring or gasket having a bottom lip, a bottom plate having an upturned flange engaging said bottom lip, and means for holding said bottom plate in place.

3. A lid or cover comprising a top plate having an integral peripheral loop, a reinforcing steel plate the peripheral part of which extends into said loop to attach said plates together, said loop having a downward extension provided at its bottom with lugs, a peripheral packing ring or gasket having at its top an inwardly extending lip fitting against said downward extension and engaged by said lugs when they are turned outward and engaged with said lip, said ring or gasket having a bottom lip, a bottom plate having an upturned flange engaging said bottom lip, a central spacer between said steel plate and said bottom plate, a knob above said spacer and a screw passing through said spacer and engaging said knob and having a head which serves to hold said bottom plate in place.

4. A lid or cover comprising a top plate having an integral peripheral loop, a rinforcing steel plate the peripheral part of which extends into said loop to attach said plates together, said loop having a downward extension provided at its bottom with lugs, a peripheral packing ring or gasket having at its top an inwardly extending lip fitting against said downward extension and engaged by said lugs when they are turned outward and engaged with said lip, said ring or gasket having a bottom lip, a bottom plate having an upturned flange engaging said bottom lip, a central spacer between said steel plate and said bottom plate, a knob above said spacer, a screw passing through said spacer and engaging said knob and having a head which serves to hold said bottom plate in place, and a nut embedded in said knob and engaged by a threaded part of said screw.

In testimony whereof I affix my signature.

HUGH H. WARD, Jr.